(12) United States Patent
Liu et al.

(10) Patent No.: US 11,795,330 B1
(45) Date of Patent: Oct. 24, 2023

(54) POLYPYRROLE ENCAPSULATED GRAPHENE CORROSION INHIBITOR CONTAINER AND ITS PREPARATION METHOD AND COMPOSITE COATING AND ITS APPLICATION

(71) Applicant: Harbin Engineering University, Harbin (CN)

(72) Inventors: Qi Liu, Harbin (CN); Yue Sun, Harbin (CN); Peili Liu, Harbin (CN); Rongrong Chen, Harbin (CN); Jun Wang, Harbin (CN); Gaohui Sun, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/127,678

(22) Filed: Mar. 29, 2023

(30) Foreign Application Priority Data

Mar. 31, 2022 (CN) .......................... 202210336957.8

(51) Int. Cl.
*C09D 5/08* (2006.01)
*C09D 175/04* (2006.01)

(52) U.S. Cl.
CPC ........... *C09D 5/084* (2013.01); *C09D 175/04* (2013.01)

(58) Field of Classification Search
CPC .............................. C09D 5/084; C09D 175/04
(Continued)

(56) References Cited

U.S. PATENT DOCUMENTS

2015/0129809 A1* 5/2015 Gauthy .................. C08K 3/042
252/511
2017/0037257 A1* 2/2017 Yang .................... C09D 5/1618
(Continued)

FOREIGN PATENT DOCUMENTS

| CN | 105832651 A | 8/2016 |
| CN | 106928810 A | 7/2017 |

(Continued)

OTHER PUBLICATIONS

GB/T 5210-2006, Paints and Varnishes-Pull-off test for adhesion, China National Standards, 2006, General Administration of Quality Supervision, Inspection and Quarantine of the People's Republic of China.

(Continued)

*Primary Examiner* — Brian K Talbot
(74) *Attorney, Agent, or Firm* — Bayramoglu Law Offices LLC (57) ABSTRACT

A polypyrrole-coated graphene corrosion inhibitor container and its preparation method and a composite coating and its application are provided. The polypyrrole encapsulated graphene corrosion inhibitor container includes graphene oxide and a polyvinylo layer encapsulated on the surface of the graphene oxide. The invention is based on a polymerization reaction by mixing a polypyrrole acid solution, a graphene oxide dispersion, and an initiator to obtain a polypyrrole encapsulated graphene corrosion inhibitor container. The polypyrrole encapsulated graphene corrosion inhibitor container regulates the release rate of the corrosion inhibitor by wrapping the polypyrrole around the graphene oxide so that it is released rapidly in alkaline solutions and at a slower rate in neutral media. The results of the practical example show that the polypyrrole encapsulated graphene corrosion inhibitor container can regulate the release rate of the corrosion (Continued)

inhibitor and has excellent corrosion protection properties and corrosion protection durability.

7 Claims, 1 Drawing Sheet

(58) Field of Classification Search
USPC .................................... 427/212, 220, 565
See application file for complete search history.

(56) References Cited

U.S. PATENT DOCUMENTS

| | | | | |
|---|---|---|---|---|
| 2017/0225233 | A1* | 8/2017 | Zhamu | .................... C22C 49/14 |
| 2018/0179345 | A1* | 6/2018 | Al-Harthi | .................. C08J 5/18 |
| 2019/0345345 | A1* | 11/2019 | Meng | ................... C09D 149/00 |

FOREIGN PATENT DOCUMENTS

| | | | | |
|---|---|---|---|---|
| CN | 107760205 | A | 3/2018 | |
| CN | 109608923 | A | 4/2019 | |
| CN | 10564266 | A | 12/2019 | |
| CN | 110835488 | A | 2/2020 | |
| CN | 111592809 | A | 8/2020 | |
| CN | 111850657 | A | * 10/2020 | ............. C25D 15/00 |
| CN | 113150644 | A | 7/2021 | |
| CN | 113265185 | A | 8/2021 | |
| CN | 113321985 | A | 8/2021 | |
| CN | 113429784 | A | * 9/2021 | |
| CN | 113817387 | A | * 12/2021 | |
| KR | 20190122531 | A | 10/2019 | |

OTHER PUBLICATIONS

Wang Lingling, et al., Research Progress in Graphene-Based Self-Healing Anti-Corrosion Coatings, Paint & Coatings Industry, 2021, pp. 83-88, vol. 51, No. 5.

* cited by examiner

POLYPYRROLE ENCAPSULATED GRAPHENE CORROSION INHIBITOR CONTAINER AND ITS PREPARATION METHOD AND COMPOSITE COATING AND ITS APPLICATION

CROSS REFERENCE TO THE RELATED APPLICATIONS

This application is based upon and claims priority to Chinese Patent Application No. 202210336957.8, filed on Mar. 31, 2022, the entire contents of which are incorporated herein by reference.

TECHNICAL FIELD

The present invention belongs to the technical field of self-healing anti-corrosion coatings, and specifically relates to a polypyrrole encapsulated encapsulated graphene corrosion inhibitor container and its preparation method and a composite coating and its application

BACKGROUND

Traditional epoxy coatings are widely used in various industrial applications due to their good physical and chemical properties, dielectric properties and excellent bonding strength to the material surface. However, due to the incomplete curing and high internal stress of epoxy resins, pinholes and micro-cracks can occur on the surface of the coating when in long-term service under alternating environments, leading to localised corrosion of the metal and a significant reduction in the service life of the coating. Self-repairing anti-corrosion coatings can use the corrosion process to initiate corrosion inhibition, and actively inhibit the occurrence of corrosion, so that the coating can continue to play its protective role without human intervention.

Graphene flakes have attracted a lot of interest from corrosion protection researchers due to their excellent chemical stability, barrier properties and other physical properties. However, due to its high surface area and strong van der Waals forces, lamellar graphene is prone to agglomeration reactions that affect its corrosion protection properties. Most of the common graphene self-healing anti-corrosion coatings are modified with specific groups of graphene and then loaded with corrosion inhibitors to achieve the self-healing effect. Patent 201910917465.6 discloses an anti-corrosion composite coating material with self-healing function and the preparation method of anti-corrosion composite coating, using tea polyphenol modified graphene to prepare TP/GE nanohybrid material, and then adding it to epoxy resin to prepare anti-corrosion composite coating material. Patent 202110565852.5 discloses a self-healing heavy-duty anti-corrosion coating containing graphene modified organotitanium nanopolymer; Patent 201810934463.3 discloses a coating based on graphene nanocontainer, self-healing coating and its preparation and application.

At present, there are many studies and applications of graphene corrosion inhibitor vessels, but most of the nanovessels achieve self-healing without proper control and regulation of the 'switch', but directly rely on the release of the corrosion inhibitor itself to achieve repair, which may result in too fast or too slow release of the corrosion inhibitor, or no corrosion inhibitor release after a long period of time, resulting in repair failure.

SUMMARY

The purpose of the present invention is to provide a polypyrrole encapsulated encapsulated graphene corrosion inhibitor container and its preparation method and a composite coating and its application, the polypyrrole encapsulated graphene corrosion inhibitor container provided by the present invention can adjust the release rate of the corrosion inhibitor, has excellent anti-corrosion performance and anti-corrosion durability.

To achieve the above purpose, the present invention provides the following technical solution: a polypyrrole encapsulated graphene corrosion inhibitor container comprising: graphene oxide and a polypyrrole layer encapsulated on the surface of the graphene oxide.

Preferably, the mass ratio of polypyrrole to graphene oxide in the polypyrrole encapsulated graphene corrosion inhibitor container is (0.4-0.6):(0.01-0.015); the graphene oxide is flake graphene oxide.

The present invention also provides a method for the preparation of a polypyrrole encapsulated graphene corrosion inhibitor container as described in the above embodiment, comprising the following steps:

The polymerization reaction is carried out by mixing pyrrole hydrochloric acid solution, graphene oxide dispersion and initiator to obtain polypyrrole encapsulated graphene corrosion inhibitor container.

The present invention also provides a polypyrrole encapsulated graphene loaded corrosion inhibitor comprising: a polypyrrole encapsulated graphene corrosion inhibitor container and a corrosion inhibitor; the polypyrrole encapsulated graphene corrosion inhibitor container is a polypyrrole encapsulated graphene corrosion inhibitor container as described above or a polypyrrole encapsulated graphene corrosion inhibitor container obtained by a preparation method as described above; the corrosion inhibitor is loaded on polypyrrole encapsulated graphene corrosion inhibitor container graphene oxide in the polyviscose encapsulated graphene corrosion inhibitor container.

The present invention also provides a method of preparing a polypyrrole encapsulated graphene corrosion inhibitor as described in the above scheme, comprising the steps:

(1) Mixing and loading graphene oxide dispersions and corrosion inhibitor solutions to obtain loaded graphene oxide dispersions.

(2) Mixing the pyrrole hydrochloric acid solution, the loaded graphene oxide dispersion and the initiator, the polymerization reaction is carried out to obtain a polypyrrole encapsulated graphene corrosion inhibitor container.

Preferably, the dispersion medium of the graphene oxide dispersion is water, and the concentration of the graphene oxide dispersion is 0.01-0.1 g/mL; the solvent of the corrosion inhibitor solution is an organic solvent, and the concentration of the corrosion inhibitor solution is 0.015-0.025 g/mL; the mass ratio of graphene oxide in the graphene oxide dispersion and the corrosion inhibitor in the corrosion inhibitor solution is 1:(90-110); the volume ratio of pyrrole monomer to hydrochloric acid in the pyrrole hydrochloric acid solution is (25-34):1000; the molar concentration of the hydrochloric acid is 1 mol/L; the mass ratio of the initiator and pyrrole monomer is (15-18):(25-30); the mass ratio of the initiator and pyrrole monomer is (15-18):(25-30); the mass ratio of graphene oxide to monomer is 1:(50-60).

Preferably, the mixing in step (2) is carried out by sonicating a solution of pyrrole hydrochloric acid with a loaded graphene oxide dispersion and then adding the initiator; the polymerization reaction is carried out at room temperature and the polymerization reaction time is 20-30 h.

The present invention also provides an epoxy-modified polyurethane composite coating comprising the following components by weight: 0.16-0.66 parts of the polypyrrole encapsulated graphene corrosion inhibitor, 220-230 parts of epoxy-modified polyurethane resin and 9.44-18.88 parts of N,N-dimethylformylamine; the polypyrrole encapsulated graphene corrosion inhibitor is the polyvic-coated graphene-loaded corrosion inhibitor described above.

The invention also provides for the application of epoxy-modified polyurethane composite coatings in metal corrosion protection as described in the above scheme.

Preferably, the application comprises the steps:
(1) Mixing epoxy-modified polyurethane composite coatings and amine curing agents to obtain a coating solution.
(2) The coating solution is applied to the metal surface and then dried and cured in sequence to form an epoxy-modified polyurethane composite coating on the metal surface.

The present invention provides a polypyrrole encapsulated graphene corrosion inhibitor container comprising: graphene oxide and a polypyrrole layer encapsulated on the surface of the graphene oxide. The polypyrrole wrapped around graphene oxide regulates the release rate of the corrosion inhibitor. The polypyrrole is pH sensitive and will release different concentrations of corrosion inhibitor in different pH environments. In addition, when the seawater penetrates deeper, the corrosion inhibitor is released and interacts with the metal ions to form a precipitation film or insoluble coordination film, which then polymerises on the metal surface to form a precipitation protection film, thus stopping the corrosion process. The invention provides a polypyrrole-coated graphene corrosion inhibitor container with polypyrrole as the outermost layer. The polypyrrole has good electrical conductivity and not only reduces the accumulation of electrons on the substrate, but also stabilises the dissolution of the passivated oxide film and maintains the surface potential of the substrate, thereby inhibiting the corrosion process.

Further, the invention is based on graphene oxide in flake form, which acts as a flake material and is able to reduce the penetration of corrosive media in the coating.

The present invention also provides a method for the preparation of polypyrrole encapsulated graphene corrosion inhibitor containers as described in the above scheme. The preparation method provided by the present invention is not only simple in steps, but also convenient and safe, low cost and has good economic and social benefits.

The present invention also provides a polypyrrole encapsulated graphene loaded corrosion inhibitor. The present invention provides a polypyrrole encapsulated graphene-loaded corrosion inhibitor having an adjustable release rate, which improves the utilization of the loaded corrosion inhibitor and extends the service life of the corrosion inhibitor.

The present invention also provides a method for preparing the polypyrrole encapsulated graphene-loaded corrosion inhibitor described in the above embodiment. The preparation method provided by the present invention is simple in steps, easy to operate, has a high yield and has the potential for large-scale industrial application.

The present invention also provides an epoxy-modified polyurethane composite coating, prepared from the following weight parts of raw materials: 0.16-0.66 parts of polypyrrole-coated graphene-loaded corrosion inhibitor, 220-230 parts of epoxy-modified polyurethane resin and 9.44-18.88 parts of N,N-dimethylformamide; the polypyrrole-coated graphene-loaded corrosion inhibitor is the polypyrrole-coated graphene-loaded corrosion inhibitor described above. The epoxy-modified polyurethane composite coating of the present invention is based on the polypyrrole graphene-loaded corrosion inhibitor provided by the present invention, which has excellent anti-corrosion performance and corrosion resistance permanence; using epoxy-modified polyurethane resin as raw material not only solves the problem of high internal stress and incomplete reaction of pure epoxy resin, but also does not crack the composite coating under alternating temperature and alternating stress environment, and can maintain good edge retention.

The invention also provides for the application of epoxy-modified polypyrrole composite coatings in metal corrosion protection as described above. The epoxy-modified polyurethane composite coating provided by the invention is applied to metal surfaces, which not only inhibits the occurrence of metal corrosion and provides protection to the metal, but also adheres closely to the metal surface and is not easily peeled off, resulting in a long service life.

BRIEF DESCRIPTION OF THE DRAWINGS

To illustrate more clearly the technical solutions in the embodiments of the invention or in the prior art, a brief description of the drawings required for the embodiments will be given below, it being obvious that the drawings in the following description are only some embodiments of the invention and that other drawings may be obtained on the basis of them without any creative effort on the part of a person of ordinary skill in the art.

DETAILED DESCRIPTION OF THE EMBODIMENTS

The present invention provides a polypyrrole encapsulated graphene corrosion inhibitor container comprising: graphene oxide and a polypyrrole layer encapsulated on the surface of the graphene oxide.

In the present invention, the mass ratio of polypyrrole to graphene oxide in the polypyrrole encapsulated graphene corrosion inhibitor container is preferably (0.4-0.6):(0.01-0.015), more preferably (0.45-0.55):(0.011-0.014), further preferably (0.5-0.52):(0.012-0.013); the graphene oxide is preferably flake graphene oxide.

The present invention also provides a method of preparing a graphene corrosion inhibitor container wrapped in polyvicol for the above scheme, comprising the steps:

Mixing pyrrole hydrochloric acid solution, graphene oxide dispersion and initiator for polymerization reaction to obtain a polypyrrole encapsulated graphene corrosion inhibitor container.

The present invention also provides a polypyrrole encapsulated graphene loaded corrosion inhibitor comprising: a polypyrrole encapsulated graphene corrosion inhibitor container and a corrosion inhibitor; polypyrrole encapsulated graphene corrosion inhibitor container is a polypyrrole encapsulated graphene corrosion inhibitor container as described above or a polypyrrole encapsulated graphene corrosion inhibitor container obtained by the preparation method; the corrosion inhibitor is loaded on the graphene oxide in the polypyrrole encapsulated graphene corrosion inhibitor container.

The present invention also provides a method of preparing the polypyrrole encapsulated graphene loaded corrosion inhibitor described in the above embodiment, comprising the following steps:

(1) Mix the graphene oxide dispersion and the corrosion inhibitor solution to obtain a loaded graphene oxide dispersion;

(2) Mix the pyrrole hydrochloric acid solution, the loaded graphene oxide dispersion and the initiator to carry out a polypyrrole reaction to obtain a polypyrrole wrapped graphene loaded corrosion inhibitor.

In the present invention, the graphene oxide dispersion is mixed with a corrosion inhibitor solution to obtain a loaded graphene oxide dispersion. In the present invention, the dispersion medium of the graphene oxide dispersion is preferably water; the concentration of the graphene oxide dispersion is preferably 0.01-0.1 g/mL, more preferably 0.03-0.08 g/mL, further preferably 0.05-0.06 g/mL; in specific embodiments of the present invention, the graphene oxide dispersion is preferably obtained by dispersing the graphene oxide in water. In the present invention, the graphene oxide is preferably prepared by the modified Hummers method; the water is preferably deionized water; the dispersion is preferably ultrasonic dispersion. By limiting the concentration of the graphene oxide dispersion to the above mentioned range, the problem of graphene oxide agglomeration caused by high graphene oxide content can be avoided and the loading of the corrosion inhibitor can be facilitated.

In the present invention, the corrosion inhibitor is preferably benzotriazole; the solvent of the corrosion inhibitor solution is preferably an organic solvent, the organic solvent preferably comprising one or more of an alcohol, a halogenated cone and an amide; the alcohol is preferably ethanol; the halogenated cone is preferably chloroform; the amide is preferably N,N-dimethylformamide; the concentration of the corrosion inhibitor solution is preferably 0.015-0.025 g/mL, more preferably 0.017-0.022 g/mL, further preferably 0.019-0.021 g/mL; in specific embodiments of the present invention, the corrosion inhibitor is preferably dissolved in an organic solvent to obtain a corrosion inhibitor solution. In the present invention, the mass ratio of graphene oxide to corrosion inhibitor is preferably 1:(90-110), more preferably 1:(95-105), further preferably 1:(98-102).

In a specific embodiment of the present invention, the corrosion inhibitor solution is preferably added to the graphene oxide dispersion for mixing; the mixing is preferably carried out by stirring; the mixing temperature is preferably room temperature and the mixing time is preferably 20-30 h, more preferably 22-27 h, further preferably 24-25 h. During the mixing process, the corrosion inhibitor is uniformly dispersed on the graphene oxide nanosheets and fully The corrosion inhibitor is uniformly dispersed on the graphene oxide nanosheets and fully bound to the graphene oxide surface.

After obtaining the loaded graphene oxide dispersion, the present invention mixes the pyrrole hydrochloric acid solution, the loaded graphene oxide dispersion and the initiator to carry out a polymerization reaction to obtain a polypyrrole wrapped graphene-loaded corrosion inhibitor. In the present invention, the mass ratio of initiator and pyrrole monomer is preferably (15-18):(25-30), more preferably (16-18):(25-28), further preferably (17-18):(27-28); the mass ratio of graphene oxide and pyrrole monomer is preferably 1:(50-60), more preferably 1:(52-58), further preferably 1:(54-56); the initiator is preferably persulfate and The initiator is preferably one or more of persulfate and azo diisobutyl squint hydrochloride; the persulfate is preferably one or more of hydrogen persulfate and potassium persulfate. Preferably, the invention is based on mixing the monomer pyrrole with hydrochloric acid to obtain a solution of pyrrole hydrochloric acid. In specific embodiments of the present invention, it is preferred to add pyrrole monomer to hydrochloric acid to obtain a bright yellow homogeneous solution, i.e. pyrrolehydrochloric acid solution. In the present invention, the volume ratio of pyrrole monomer to hydrochloric acid is preferably (25-34):1000, more preferably (26-32):1000, further preferably (28-30):1000; the molar concentration of hydrochloric acid is preferably 1 mol/L. In specific embodiments of the present invention, it is preferred that the pyrrolesolution is added to the loaded graphene oxide dispersion and sonicated, and then the initiator is added; the addition rate of the pyrrole pyrrolesolution is preferably 5-10 mL/min, more preferably 6-9 mL/min, further preferably 7-8 mL/min; the addition method of pyrrolesolution is preferably dropwise; the sonication time is preferably 8-15 min, more preferably 9-14 min, further preferably 10-12 min. In the present invention, the temperature of the polymerization reaction is preferably room temperature, the room temperature being specifically 25° C.; the time of the polymerization reaction is preferably 20-30 h, more preferably 23-27 h, further preferably 25-26 h; the solution rapidly turns black at the beginning of the polymerization reaction. The polymerization reaction is preferably carried out under stirring conditions.

After the polymerization reaction is completed, the present invention preferably post-treats the product solution from the polymerization reaction to obtain a polypyrrole graphene encapsulated corrosion inhibitor container. In the present invention, the post-processing preferably includes: washing, filtering and drying the product solution in turn; the washing detergent is preferably deionized water; washing is preferably carried out under centrifugal conditions; the rate of said centrifugation is preferably 8000 r-min$^{-1}$, the number of washing is preferably 3-5 times, more preferably 4 times, and the time of each washing is preferably 4-10 min, more preferably 5-8 min, The drying temperature is preferably 50-70° C., more preferably 55-65° C., further preferably 57-62° C.; the drying time is preferably 24-36 h, more preferably 28-33 h, further preferably 30-32 h. The drying time is preferably 24-36 h, more preferably 28-33 h, further preferably 30-32 h.

The invention also provides an epoxy-modified polyurethane composite coating comprising the following components by weight: 0.16-0.66 parts of a polypyrrole-coated graphene-loaded corrosion inhibitor, 220-230 parts of an epoxy-modified polyurethane resin and 9.44-18.88 parts of N,N-dimethylformylamine.

The epoxy-modified polyurethane composite coating provided by the present invention comprises 0.16-0.66 parts, preferably 0.20-0.60 parts, more preferably 0.30-0.50 parts, further preferably 0.35-0.45 parts of the polypyrrole-coated graphene-loaded corrosion inhibitor; the polypyrrole-coated graphene-loaded corrosion inhibitor is a polypyrrole-coated graphene-loaded corrosion inhibitor of the above-mentioned scheme.

The epoxy-modified polyurethane composite coating of the present invention comprises 220-230 parts, preferably 221-229 parts, more preferably 223-227 parts and further preferably 225-226 parts of epoxy-modified polyurethane resin, in terms of the weight of the graphene-loaded corrosion inhibitor encapsulated in polypyrrole.

The epoxy-modified polyurethane composite coating of the present invention comprises 9.44-18.88 parts, preferably 10-18 parts, more preferably 12-16 parts, and further preferably 13-15 parts of N,N-dimethylformamide by weight of polypyrrole graphene-loaded corrosion inhibitor. In the present invention, N,N-dimethylformamide is the solvent, which plays the role of regulating the viscosity of the composite coating. In specific embodiments of the present invention, the viscosity of the composite coating is preferably adjusted to less than 500 mPa·s, preferably 300-500 mPas, more preferably 400-450 mPas, by controlling the amount of N,N-dimethylformamide, in order to facilitate film formation.

In the present invention, the method of preparing the epoxy-modified polyurethane composite coating preferably comprises the following steps: mixing a polypyrrole-coated graphene-loaded corrosion inhibitor and an epoxy-modified polyurethane resin, then adding N,N-dimethylformamide to obtain the epoxy-modified polyurethane composite coating.

In the present invention, the mixing is preferably carried out by means of ultrasonic dispersion; the time of ultrasonic dispersion is preferably 5-10 min, more preferably 6-9 min, further preferably 7-8 min. The viscosity of the composite coating is adjusted to less than 500 mPa·s by adding N,N-dimethylformylamine, which facilitates film formation.

The invention also provides for the application of epoxy-modified polyurethane composite coatings in metal corrosion protection as described in the above scheme.

In the present invention, the application preferably comprises the following steps: mixing the epoxy-modified polyurethane composite coating and the amine curing agent to obtain the coating solution; applying the coating solution to the metal surface, and then drying and curing in sequence to form the epoxy-modified polyurethane composite coating on the metal surface.

In the present invention, the epoxy-modified polyurethane resin and the amine curing agent in the epoxy-modified polyurethane composite coating are preferably in a mass ratio of (2.2-2.3):1, more preferably (2.23-2.28):1, further preferably (2.25-2.27): 1; the amine curing agent is preferably a polyamide curing agent; the mixing is preferably carried out by means of ultrasonication; the pretreatment preferably comprises: grinding and scrubbing the metal surface in sequence, or sandblasting the metal surface; sanding is preferably done with 600.800 and 1200 grit sandpaper in sequence; scrubbing is preferably done with organic reagents, preferably acetone; the metal is preferably carbon steel.

In the present invention, the drying time is preferably 1 to 3 d, more preferably 1 to 2 d, further preferably 2 d. The curing temperature is preferably 90-100° C., more preferably 92-98° C., further preferably 94-96° C. The curing time is preferably 8-15 h, more preferably 10-14 h, further preferably 12-13 h.

To further illustrate the present invention, the polypyrrole encapsulated graphene corrosion inhibitor containers provided herein are described in detail below in conjunction with the accompanying drawings and examples. The following is a detailed description of the polypyrrole encapsulated graphene corrosion inhibitor containers provided by the invention, but they are not to be construed as limiting the scope of protection of the invention.

Example 1

(1) 0.01 g of graphene oxide powder prepared by the modified Hummers method was sonicated and dispersed in 20 mL of deionised water to obtain a graphene oxide dispersion; 1 g of benzotriazolium was added to 50 mL of ethanol solution to obtain a retarder solution; the retarder solution was then added to the graphene oxide dispersion and the resulting dispersion was stirred continuously at room temperature for 24 h to allow the benzotriazolium to be uniformly dispersed on the graphene oxide nanosheets, i.e. GO-BTA, denoted as GB.

(2) Add 0.58 mL of pyrrole monomer to 20 mL of 1 mol/L HCL to obtain a bright yellow homogeneous pyrrolesolution; gradually add the pyrrolesolution to the loaded graphene oxide dispersion and sonicate the resulting solution for 10 min; then add 0.36 g of Ammonium persulfate to the resulting solution to carry out the polymerization reaction, the solution rapidly turns black and continues to stir for 24 h at room temperature to complete the polymerization reaction. The solution was stirred for 24 h at room temperature to complete the polymerization reaction; finally, the solution was washed three times with deionised water at 8000 r, min'1 for 5 min each time; the collected precipitate was dried at 60° C. for 24 h to obtain a polyvinyl graphene-loaded corrosion inhibitor, denoted as GBP.

(3) 0.0016 g of graphene-loaded corrosion inhibitor wrapped in polypyrrole was ultrasonically dispersed in 2.27 g of epoxy-modified polyurethane resin, and the viscosity of the composite coating was adjusted to less than 500 mPas using N,N-dimethylformamide. The epoxy-modified polyurethane composite coating was obtained by curing at 90° C. for 12 h to ensure completion of the curing process, and was recorded as GBP/EP-PU.

Example 2

(1) 0.01 g of graphene oxide powder prepared by the modified Hummers method was sonicated and dispersed in 20 mL of deionised water to obtain a graphene oxide dispersion; 1 g of benzotriazolium was added to 50 mL of ethanol solution to obtain a retarder solution; the retarder solution was then added to the graphene oxide dispersion and the resulting dispersion was stirred continuously at room temperature for 24 h to allow the benzotriazolium to be uniformly dispersed on the graphene oxide nanosheets, i.e. GO-BTA, denoted as GB.

(2) Add 0.58 mL of pyrrole monomer to 20 mL of 1 mol/L HCl to obtain a bright yellow homogeneous pyrrolesolution; gradually add the pyrrolesolution to the loaded graphene oxide dispersion and sonicate the resulting solution for 10 min; then add 0.36 g of Ammonium persulfate to the resulting solution to carry out the polymerization reaction, the solution rapidly turns black and continues to stir for 24 h at room temperature to complete the polymerization reaction. The solution was stirred for 24 h at room temperature to complete the polymerization reaction; finally, the solution was washed three times with deionised water at 8000 r·min$^{-1}$ for 5 min each time; the collected precipitate was dried at 60° C. for 24 h to obtain a polyvinyl graphene-loaded corrosion inhibitor, denoted as GBP.

(3) 0.0033 g of Polypyrrole encapsulated graphene loaded corrosion inhibitor was ultrasonically dispersed in 2.27 g of epoxy modified polyurethane resin, the viscosity of the composite coating was adjusted to less than 500 mPas using N,N-dimethylformamide, then 1 g of amine curing agent was added and ultrasonically homogenized, and then coated on the pretreated carbon steel surface; the coating was dried at room temperature for 3 d and then cured at 90° C. for 12 h to ensure the completion of the curing process to obtain the epoxy modified polyurethane composite coating, denoted as GBP/EP-PU.

Example 3

(1) 0.01 g of graphene oxide powder prepared by the modified Hummers method was ultrasonically dispersed in 20 mL of deionized water to obtain graphene oxide dispersion; 1 g of benzotriazolium was added to 50 mL of ethanol solution to obtain a retarder solution; then the retarder solution was added to the graphene oxide dispersion and the resulting dispersion was stirred continuously at room temperature for 24 h to make the benzotriazolium dispersion on the graphene oxide nanosheets, i.e. GO-BTA, denoted as GB.

(2) Add 0.58 mL of pyrrole monomer to 20 mL of 1 mol/L HCL to obtain a bright yellow homogeneous pyrrolesolution; gradually add the pyrrolesolution to the loaded graphene oxide dispersion and sonicate the resulting solution for 10 min; then add 0.36 g of Ammonium persulfate to the resulting solution for polymerization reaction, the solution rapidly turns black and continues to stir for 24 h at room temperature to complete the polymerization reaction. The solution was stirred for 24 h at room temperature to complete the polymerization reaction; finally, the solution was washed three times with deionised water at 8000 r·min$^{-1}$ for 5 min each time; the collected precipitate was dried at 60° C. for 24 h to obtain a polypyrrole graphene-loaded corrosion inhibitor, denoted as GBP.

(3) 0.0049 g of polypyrrole wrapped graphene loaded corrosion inhibitor was sonicated and dispersed in 2.27 g of epoxy modified polyurethane resin, the viscosity of the composite coating was adjusted to less than 500 mPas using N,N-dimethylformamide, then 1 g amine curing agent was added and continued to be sonicated uniformly, and then coated on the pretreated carbon steel surface; the coated sample was dried at room temperature for 3 d, and then cured for 12 h at C to ensure completion of the curing process. The coated samples were dried at room temperature for 3 d, then cured at 90° C. for 12 h to ensure completion of the curing process, resulting in an epoxy-modified polyurethane composite coating, noted as GBP/EP-PU.

Example 4

(1) 0.01 g of graphene oxide powder prepared by the modified Hummers method was ultrasonically dispersed in 20 mL of deionized water to obtain graphene oxide dispersion; 1 g of benzotriazolium was added to 50 mL of ethanol solution to obtain the retarder solution; then the retarder solution was added to the graphene oxide dispersion and the resulting dispersion was stirred continuously at room temperature for 24 h to make the benzotriazolium dispersion on the graphene oxide nanosheets, i.e. GO-BTA, denoted as GB. The resulting dispersion was stirred continuously at room temperature for 24 h to achieve uniform dispersion of benzoic and graphene oxide on the graphene oxide nanosheets to obtain a loaded graphene oxide dispersion, i.e. GO-BTA, denoted as GB.

(2) Add 0.58 mL of pyrrole monomer to 20 mL of 1 mol/L HCL to obtain a bright yellow homogeneous pyrrolesolution; gradually add the pyrrolesolution to the loaded graphene oxide dispersion and sonicate the resulting solution for 10 min; then add 0.36 g of Ammonium persulfate to the resulting solution for polymerization reaction, the solution rapidly turns black and continues to stir for 24 h at room temperature to complete the polymerization reaction. The solution was stirred for 24 h at room temperature to complete the polymerization reaction; finally, the solution was washed three times with deionised water at 8000 r·min$^{-1}$ for 5 min each time; the collected precipitate was dried at 60° C. for 24 h to obtain a polyvinyl graphene-loaded corrosion inhibitor, denoted as GBP.

(3) 0.0065 g of the polypyrrole encapsulated graphene loaded corrosion inhibitor was ultrasonically dispersed in 2.27 g of epoxy modified polyurethane resin, the viscosity of the composite coating was adjusted to less than 500 mPas using N,N-dimethylformamide, then 1 g of amine curing agent was added and continued to be ultrasonically homogenized, and then coated on the pretreated carbon steel surface; the coating was dried at room temperature for 3 d after completion, and then cured at 90° C. for 12 h to ensure the completion of the curing process, to obtain the epoxy modified polyurethane composite coating, noted as GBP/EP-PU.

Contrast Ratio 1

N,N-dimethylformamide was used to adjust the viscosity of 2.27 g of epoxy-modified polyurethane resin to less than 500 mPas. Then 1 g of amine curing agent was added and sonicated uniformly, and then coated on the pretreated carbon steel surface; after the coating was completed, it was dried at room temperature for 3 d and then cured at 90° C. for 12 h to ensure the completion of the curing process, resulting in a pure epoxy-modified polyurethane coating, noted as EP-PU.

Contrast Ratio 2

0.0049 g of graphene oxide GO was sonicated and dispersed in 2.27 g of epoxy-modified polyurethane resin, and the viscosity of the graphene oxide and epoxy-modified polyurethane resin mixture was adjusted to less than 500 mPa·s using N,N-dimethylformamide, then 1 g of amine curing agent was added and continued to be sonicated and homogenised, and then coated on the pretreated carbon steel surface, The coating was then cured at 90° C. for 12 h to ensure completion of the curing process, resulting in a graphene oxide-epoxy modified polyurethane coating, noted as GO/EP-PU.

Contrast Ratio 3

(1) 0.01 g of graphene oxide powder prepared by the modified Hummers method was sonicated and dispersed in 20 mL of deionised water to obtain a graphene oxide dispersion; 1 g of benzotriazolium was added to 50 mL of ethanol solution to obtain a retarder solution; the retarder solution was then added to the graphene oxide dispersion and the resulting dispersion was stirred continuously at room temperature for 24 h to allow the benzotriazolium to be uniformly dispersed on the graphene oxide nanosheets, i.e. GO-BTA, denoted as GB.

(2) 0.0049 g of loaded graphene oxide GB was ultrasonically dispersed in 2.27 g of epoxy-modified polyurethane resin, and the viscosity of the mixture of graphene oxide and epoxy-modified polyurethane resin was adjusted to less than 500 mPaa·s using N,N-dimethylformamide, then 1 g of amine curing agent was added and ultrasonically homogenised, and then coated on the pretreated carbon steel surface. The coating was dried at room temperature for 3 d and then cured at 90° C. for 12 h to ensure completion of the curing process, resulting in a loaded graphene oxide-epoxy-modified polyurethane coating, denoted GB/EP-PU.

The adhesion properties of the coatings of Example 1 and Scales 1-3 were tested using the test method GB/T5210 and the results are shown in Table 1.

Table 1 Test results of adhesion properties of coatings obtained in Example 1 and Comparisons 1 to 3

| Coating | Dry adhesion | Adhesion after 7 days of seawater immersion |
|---|---|---|
| Comparison 1 | 2.69 MPa | L04 MPa |
| Comparison 2 | 2.9 MPa | 1.3 MPa |
| Comparison 3 | 2.98 MPa | 137 MPa |
| Example 1 | 4.17 MPa | 2.35 MPa |

As can be seen from Table 1, the dry state adhesion of the epoxy-modified polyurethane composite coating prepared in Example 1 of the invention is 4.17 MPa, and the adhesion after 7 days of seawater immersion is 2.35 MPa; the dry state adhesion of various epoxy-modified polyurethane coatings prepared in Proportions 1 to 3 ranges from 2.69-2.98 MPa, and the adhesion after 7 days of seawater immersion ranges from 1.04-1.37 MPa. It can be seen that the adhesion performance of the epoxy-modified polyurethane composite coatings prepared by the present invention is significantly better than that of the epoxy-modified polyurethane coatings prepared in ratios 1-3. This enables the epoxy-modified polyurethane composite coatings provided by the present invention to adhere better to the metal surface, which not only ensures the anti-corrosion effect of the coatings, but also extends the effective life of the coatings.

The impedance properties of the coatings of Examples 1-4 and Scales 1-3 were tested by electrochemical impedance testing and the results are shown in Tables 2-3.

by the present invention has excellent anti-corrosion properties with the coating intact, and the anti-corrosion effect is long-lasting.

As can be seen from Table 3, the impedance values of the epoxy-modified polyurethane composite coatings prepared in Examples 1-4 of the present invention were $4.47 \times 10^4$-$6.03 \times 10^4$ $\Omega \cdot cm^2$ after 2 hours of immersion in seawater, $2.24 \times 10^4$-$6.24 \times 10^4$ $\Omega \cdot cm^2$ after 8 hours of immersion in seawater, $1.75 \times 10^4$-$6.11 \times 10^4$ $\Omega \cdot cm^2$ after 24 hours of immersion in seawater, and $1.20 \times 10^4$-$5.33 \times 10^4$ $\Omega \cdot cm^2$ after 72 hours of immersion in seawater. The impedance values at all time points of Examples 1-4 were basically significantly higher than those of the coatings prepared in Proportions 1 to 3. It can be seen that the corrosion resistance of the epoxy-modified polyurethane composite coatings prepared by the present invention was still significantly better than that of Proportions 1-3 after the coating was scratched, and the advantage of the present invention became more obvious as the immersion time became longer.

The BTA release concentrations were measured using (UV-Vis) spectrophotometry for the GBP from Example 1 and the GB from Scale 3. The results of the UV-Vis absorption tests were carried out at different time points under different pH conditions for the GB and GBP solutions to obtain the BTA concentrations under the corresponding conditions, as shown in Table 4.

Table 4 Release process of corrosion inhibitor BTA with pH in polyvicol-coated graphene retarded containers

TABLE 2

Comparison of impedance values of intact coatings after immersion in seawater in '$\Omega \cdot cm^2$

| Day | Contrast 1 | Contrast 2 | Contrast 3 | Example 1 | Example 2 | Example 3 | Example 4 |
|---|---|---|---|---|---|---|---|
| 1 | $1.10 \times 10^{10}$ | $1.62 \times 10^{10}$ | $1.10 \times 10^{10}$ | $3.53 \times 10^{10}$ | $2.43 \times 10^{10}$ | $4.93 \times 10^{10}$ | $3.51 \times 10^{10}$ |
| 10 | $1.02 \times 10^9$ | $2.23 \times 10^9$ | $1.91 \times 10^9$ | $2.01 \times 10^{10}$ | $2.33 \times 10^{10}$ | $5.13 \times 10^{10}$ | $2.12 \times 10^{10}$ |
| 30 | $6.11 \times 10^8$ | $4.74 \times 10^8$ | $1.15 \times 10^9$ | $5.73 \times 10^9$ | $2.32 \times 10^{10}$ | $2.49 \times 10^{10}$ | $1.17 \times 10^{10}$ |
| 40 | $1.88 \times 10^8$ | $4.10 \times 10^8$ | $8.96 \times 10^8$ | $4.69 \times 10^9$ | $1.19 \times 10^{10}$ | $1.74 \times 10^{10}$ | $7.83 \times 10^9$ |

TABLE 3

Comparison of impedance values of scratch coatings after immersion in seawater in '$\Omega \cdot cm^2$

| h | Contrast 1 | Contrast 2 | Contrast 3 | Example 1 | Example 2 | Example 3 | Example 4 |
|---|---|---|---|---|---|---|---|
| 2 | $2.38 \times 10^4$ | $3.72 \times 10^4$ | $3.49 \times 10^4$ | $4.47 \times 10^4$ | $5.79 \times 10^4$ | $6.03 \times 10^4$ | $4.92 \times 10^4$ |
| 8 | $8.73 \times 10^3$ | $1.29 \times 10^4$ | $2.47 \times 10^4$ | $2.24 \times 10^4$ | $4.06 \times 10^4$ | $6.24 \times 10^4$ | $5.48 \times 10^4$ |
| 24 | $5.01 \times 10^3$ | $1.17 \times 10^4$ | $1.68 \times 10^4$ | $1.75 \times 10^4$ | $5.10 \times 10^4$ | $6.11 \times 10^4$ | $4.39 \times 10^4$ |
| 72 | $2.00 \times 10^3$ | $5.47 \times 10^3$ | $7.31 \times 10^3$ | $1.20 \times 10^4$ | $1.57 \times 10^4$ | $5.33 \times 10^4$ | $1.89 \times 10^4$ |

According to Table 2, the impedance values of the complete epoxy-modified polyurethane composite coatings prepared in Examples 1 to 4 of the present invention ranged from $2.43 \times 10^{10}$ to $4.39 \times 10^{10}$ $\Omega \cdot cm^2$ after 1 day of immersion in seawater, from $2.01 \times 10^{10}$ to $5.13 \times 10^{10}$ $\Omega \cdot cm^2$ after 10 days of immersion in seawater, from $5.73 \times 10^9$ to $2.49 \times 10^{10}$ $\Omega \cdot cm^2$ after 30 days of immersion in seawater, and from $4.69 \times 10^{10}$ to $1.74 \times 10^{10}$ $\Omega \cdot cm^2$ after 40 days of immersion in seawater. The impedance values at each time point of Examples 1-4 were significantly higher than those of the coatings prepared in Proportions 1-3. This shows that the epoxy-modified polyurethane composite coating prepared

| BTA release rate % | | 14 h immersion | 18 h immersion |
|---|---|---|---|
| GB | pH = 7 | 84 | 85 |
| GBP | pH = 4 | 76 | 77 |
| | pH = 7 | 70 | 72 |
| | pH = 10 | 80 | 81 |

According to Table 4, the release rate of BTA from the GBP is different under different pH conditions, with the release rate of BTA being lower under neutral conditions and higher under acidic or alkaline conditions. When the acidic or alkaline corrosive media in seawater infiltrate, the release rate of BTA from GBP will increase and the released BTA will interact with the infiltrated acidic or alkaline corrosive media, thus achieving active self-healing protection. This indicates that the capped polypyrrole on the surface of GBP acts as a pH-responsive gatekeeper and the polypyrrole-coated graphene corrosion inhibitor container prepared by the invention can regulate the release rate of the corrosion inhibitor, thus improving the corrosion resistance and corrosion permanence of the coating.

Figure 1A:
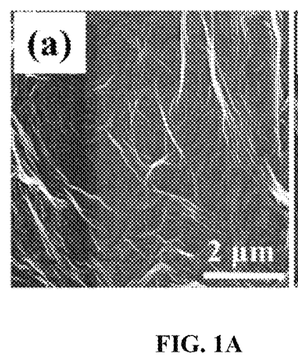
FIGS. 1A-1C show SEM images of GO (FIG. 1A) used in Contrast 2, GB (FIG. 1B) prepared in Contrast 3 and GBP (FIG. 1C) prepared in Example 1.
Figure 1B:
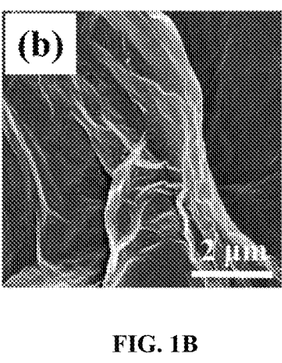
Figure 1C:
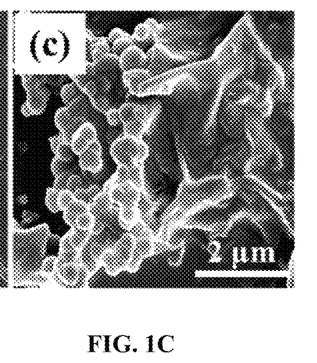

The GO used in Contrast 2, the GB prepared in Contrast 3 and the GBP prepared in Example 1 were tested using a scanning electron microscope and the results are shown in FIGS. 1A-1C. According to the SEM images of FIGS. 1A-1C, it can be seen that the polypyrrole encapsulated graphene corrosion inhibitor container provided by the present invention successfully wrapped with a polypyrrole shell and was evenly distributed without agglomeration, which ensured the realization of the retarding function.

Figure 2:
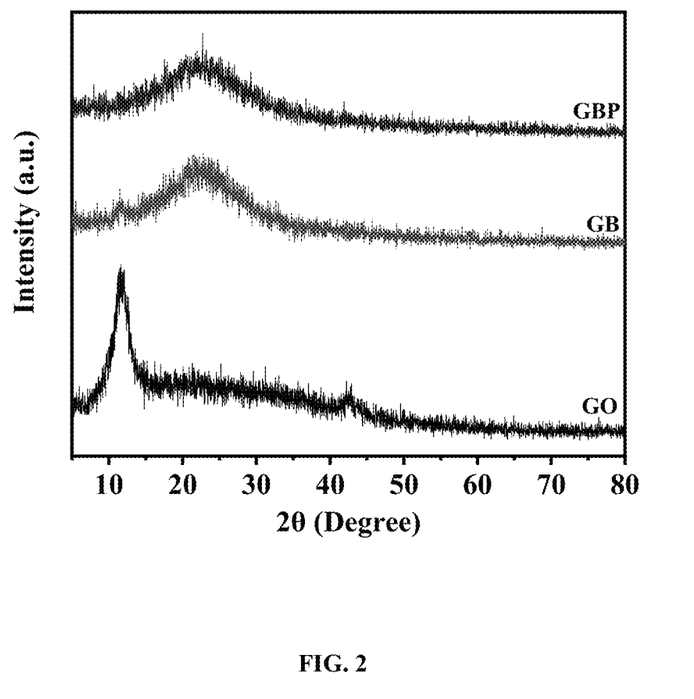
FIG. 2 shows XRD spectra of GO used in Contrast 2, GB prepared in Contrast 3 and GBP prepared in Example 1.

The results are shown in FIG. 2. According to the XRD spectra in FIG. 2, GO exhibits a strong characteristic peak at $2°=10.5°$ corresponding to the (001) crystal plane and a characteristic peak at $2°=43.1°$ corresponding to the (100) crystal plane, which are highly ordered structures and long-range ordered structures in the graphite plane, respectively. The intensity of the characteristic peak of the GB, (001) crystal plane is reduced after loading the GO surface with BTA. Due to the amorphous structure of PPy, the XRD spectrum of GBP shows an amorphous diffraction feature, and the characteristic peak of the (001) crystal plane disappears in GBP after the PPy modification, while a new broad peak appears near 21.9°. This indicates that PPy successfully covers the GB surface.

From the above examples, it can be seen that the polypyrrole encapsulated graphene corrosion inhibitor container provided by the present invention can adjust the corrosion inhibitor release rate under different pH conditions, which improves the efficiency of corrosion inhibitor utilization. The epoxy-modified polyurethane composite coating made from polypyrrole wrapped graphene corrosion inhibitor containers not only has excellent corrosion protection performance, but also has excellent corrosion durability, reducing the cost of corrosion protection on metal surfaces.

Although the above-mentioned embodiments provide an exhaustive description of the invention, they are only part of the embodiments of the invention, not all of them, and other embodiments may be obtained without inventiveness on the basis of this embodiment, all of which fall within the scope of protection of the invention.

What is claimed is:

1. An epoxy-modified polyurethane composite coating comprising the following components by weight: 0.16-0.66 parts of a polypyrrole-coated graphene-loaded corrosion inhibitor, 220-230 parts of an epoxy-modified polyurethane resin, and 9.44-18.88 parts of N, N-dimethylformamide;
   wherein the polypyrrole-coated graphene-loaded corrosion inhibitor comprises a polypyrrole-coated graphene corrosion inhibitor container and a corrosion inhibitor; the corrosion inhibitor is loaded on graphene oxide in the polypyrrole-coated graphene corrosion inhibitor container; the polypyrrole-coated graphene corrosion inhibitor container comprises the graphene oxide and a polypyrrole-coated layer on a surface of the graphene oxide;
   wherein a mass ratio of polypyrrole and the graphene oxide in the polypyrrole-coated graphene corrosion inhibitor container is (0.4-0.6):(0.01-0.015); the graphene oxide is flake graphene oxide;
   wherein a method for preparing the polypyrrole-coated graphene-loaded corrosion inhibitor comprises the following steps:
   (1) mixing and loading a graphene oxide dispersion and a corrosion inhibitor solution to obtain a loaded graphene oxide dispersion;
   (2) mixing a pyrrole hydrochloric acid solution, the loaded graphene oxide dispersion, and an initiator to carry out a polymerization reaction to obtain the polypyrrole-coated graphene-loaded corrosion inhibitor.

2. The epoxy-modified polyurethane composite coating according to claim 1,
   wherein a dispersion medium of the graphene oxide dispersion is water, and a concentration of the graphene oxide dispersion is 0.01-0.1 g/mL;
   a solvent of the corrosion inhibitor solution is an organic solvent, and a concentration of the corrosion inhibitor solution is 0.015-0.025 g/mL;
   a mass ratio of graphene oxide in the graphene oxide dispersion to a corrosion inhibitor in the corrosion inhibitor solution is 1:(90-110);
   a volume ratio of a pyrrole monomer to hydrochloric acid in the pyrrole hydrochloric acid solution is (25-34):1000; a molar concentration of the hydrochloric acid is 1 mol/L;
   a mass ratio of the initiator and the pyrrole monomer is (15-18):(25-30); a mass ratio of graphene oxide to the pyrrole monomer is 1:(50-60).

3. The epoxy-modified polyurethane composite coating according to claim 1, wherein in step (2), the mixing is conducted by an ultrasonication of the pyrrole hydrochloric acid solution with the loaded graphene oxide dispersion, followed by an addition of the initiator; the polymerization reaction is carried out at room temperature and a polymerization reaction time is 20-30 h.

4. An application of the epoxy-modified polyurethane composite coating according to claim 1 in a metal corrosion protection.

5. The application according to claim 4, comprising steps of:
   (1) mixing the epoxy-modified polyurethane composite coating with an amine curing agent to obtain a coating solution;
   (2) applying the coating solution to a metal surface, then drying and curing in sequence to form the epoxy-modified polyurethane composite coating on the metal surface.

6. The application according to claim 4, wherein
   a dispersion medium of the graphene oxide dispersion is water, and a concentration of the graphene oxide dispersion is 0.01-0.1 g/mL;
   a solvent of the corrosion inhibitor solution is an organic solvent, and a concentration of the corrosion inhibitor solution is 0.015-0.025 g/mL;
   a mass ratio of graphene oxide in the graphene oxide dispersion to a corrosion inhibitor in the corrosion inhibitor solution is 1:(90-110);
   a volume ratio of a pyrrole monomer to hydrochloric acid in the pyrrole hydrochloric acid solution is (25-34):1000; a molar concentration of the hydrochloric acid is 1 mol/L;
   a mass ratio of the initiator and the pyrrole monomer is (15-18):(25-30); a mass ratio of graphene oxide to the pyrrole monomer is 1:(50-60).

7. The application according to claim 4, wherein in step (2), the mixing is conducted by an ultrasonication of the pyrrole hydrochloric acid solution with the loaded graphene oxide dispersion, followed by an addition of the initiator; the polymerization reaction is carried out at room temperature and a polymerization reaction time is 20-30 h.

* * * * *